(No Model.)
W. A. CLARK.
TRUCK.
No. 423,672.  Patented Mar. 18, 1890.
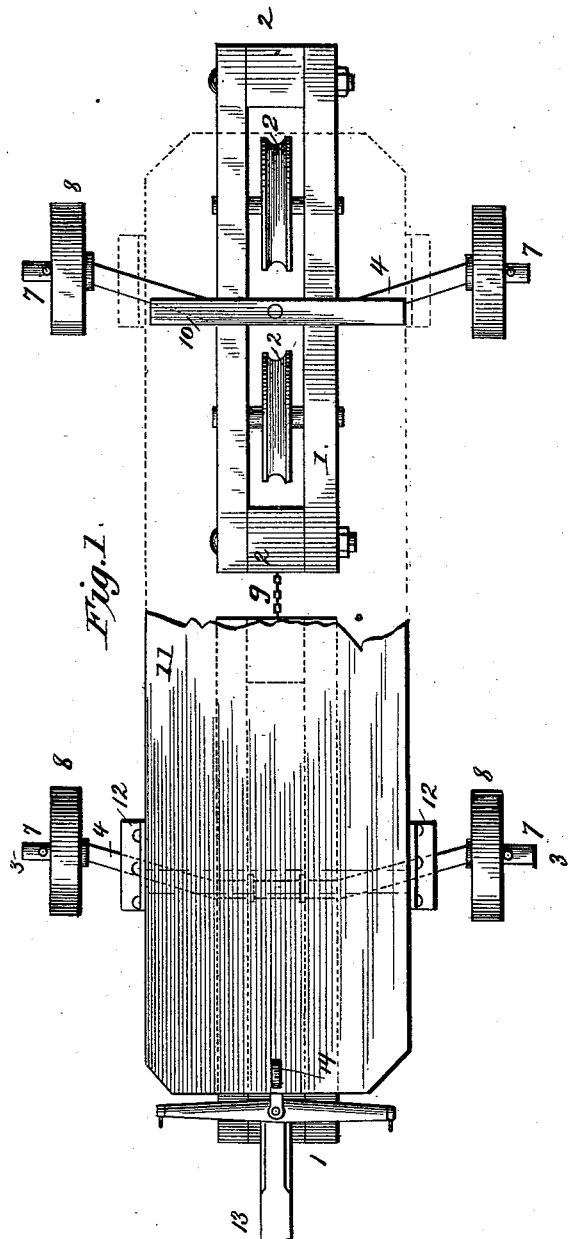
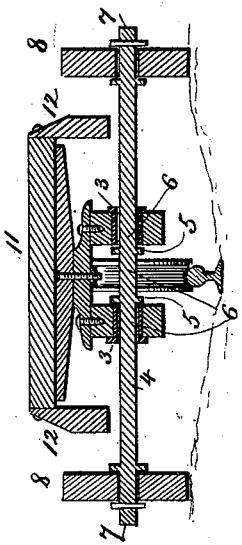
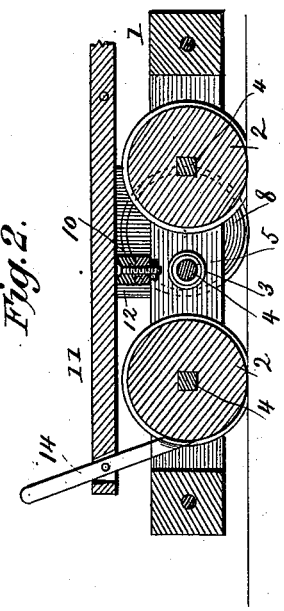
WITNESSES:
Fred G. Dieterich
Jos. A. Ryan
INVENTOR
William A. Clark
BY Munn & Co.
ATTORNEY

UNITED STATES PATENT OFFICE.

WILLIAM A. CLARK, OF CRISP, GEORGIA.

TRUCK.

SPECIFICATION forming part of Letters Patent No. 423,672, dated March 18, 1890.

Application filed August 28, 1889. Serial No. 322,271. (No model.)

*To all whom it may concern:*

Be it known that I, WILLIAM A. CLARK, of Crisp, in the county of Irwin and State of Georgia, have invented a new and useful Improvement in Transporting Apparatus, of which the following is a specification.

My invention is an improvement in that class of railway trucks or carriages which are provided with centrally-arranged wheels adapted to run on a single rail, and provided with lateral supporting-wheels that run on rails arranged one on each side of and parallel to the aforesaid single rail. Such lateral wheels afford a certain required support for the body of the truck or carriage, but the weight is carried mainly by the central wheels that run on the central rail. Heretofore the said lateral wheels have been journaled on a straight axle. In my invention I employ a bent axle, and am thus enabled to dispense with side rails for the lateral wheels which run on the ground.

Referring to the accompanying drawings, Figure 1 represents a plan view with part of the floor broken away to show the running-gear. Fig. 2 is a longitudinal section, in elevation, of the front half of the vehicle; and Fig. 3 is a cross-section of the same.

The same numerals of reference indicate corresponding parts in all the figures.

Referring to the several parts by their designating-numerals, 1 indicates the body of the truck. In the drawings I have shown two trucks coupled together, which are required to support one platform. All of the trucks and their several parts are alike, so that only one will be described in detail.

In the center of the truck-body 1 are mounted the grooved wheels 2, in line with each other, as shown. These central grooved wheels support the weight of the load being transported and run on a single rail, which may be of metal or cut out of wood, or this single track can even be made of wooden poles.

At the center of the truck-body, between the wheels 2, are metal bearing-boxes 3, through which passes a bent axle 4. This axle is formed with the shoulders 5 at each side of its center, and these shoulders prevent the axle from slipping from side to side in the bearings. The axle is straight at the points 6 where it passes through the bearings 3, and is then bent or inclined, as shown, to its ends, which are straight, as shown at 7, for the reception of the wheels 8. The bearing-boxes 3 are somewhat larger than the axle 4 where it passes through them, so that the axle can turn freely in the bearings.

The grooved central wheels 2 run on the single rail composing the track supporting the weight of the load, while the wheels 8 at the ends of the bent axle run on the dirt or ground on each side of the truck, preventing the truck from turning over. By bending the axle, as shown, it will turn in its bearings in the truck to accommodate itself to the unevenness of the ground as its end wheels 8 pass over the same, as will be readily understood. The side wheels 8 will rise and fall in passing over uneven ground without taking any of the weight from the central grooved wheels which run on the rail.

The two trucks are coupled together at their ends by a chain 9, or in any desired manner, and upon the trucks are secured bolsters 10, of the usual construction. Upon these bolsters is bolted a platform 11, upon which the load to be transported, whatever it may be, is supported. To the sides of the platform above the axles are secured the stop-blocks 12. These blocks prevent the platform from turning over too far to either side, as when it inclines to either side to a certain point the lower ends of the two stop-blocks on that side will come in contact with the axles 4 and hold the platform from turning over, while at the same time the lower ends of the blocks are normally high enough above the bent axles to permit them to play freely up and down as their end wheels pass over the irregularities of the road. To the front end of the forward truck a tongue 13 may be secured, to which the team of mules is attached to draw the apparatus; or an engine may be attached to the front end of the truck to draw the apparatus by steam-power.

It will be seen that my apparatus is simple and strong in construction, and by its use lumber and all classes of goods and merchandise can be transported over a track made of a single rail, which is far cheaper and easier to construct than the usual double-rail track, requiring no grading, &c., and being far less expensive to keep in repair, there, of course, being no "spreading" of the track possible.

A brake 14 is pivoted at the front end of the forward truck and operates on the forward grooved wheel 2 of the truck to check the speed on downgrades.

The central grooved wheels 2 serve to guide the end wheels 8 of the bent axles 4, the grooved wheels 2 keeping on the rail and thus holding the end wheels 8 in their proper position on curves in the road, &c.

Having thus described my invention, what I claim, and desire to secure by Letters Patent, is—

1. The combination, with a truck having two central grooved and aligned wheels adapted to run on the same rail, of the axle having a straight central portion, its end portions being bent or out of alignment with such central portion and carrying the lateral wheels, as shown and described.

2. The combination of the trucks having the central grooved wheels arranged one behind the other, the bolsters 10, secured upon the trucks, and the bearings 3, the bent axles passing through said bearings and having the end wheels 8, the platform bolted upon the bolsters, and stop-blocks 12, secured to the sides of the platform over the bent axles, but held normally out of contact with the latter, substantially as set forth.

WILLIAM A. CLARK.

Witnesses:
F. B. COLLINS,
G. Q. WILLIAMS.